(No Model.)
M. A. VAN ALSTINE.
MILK PAIL.
No. 394,034.  Patented Dec. 4, 1888.
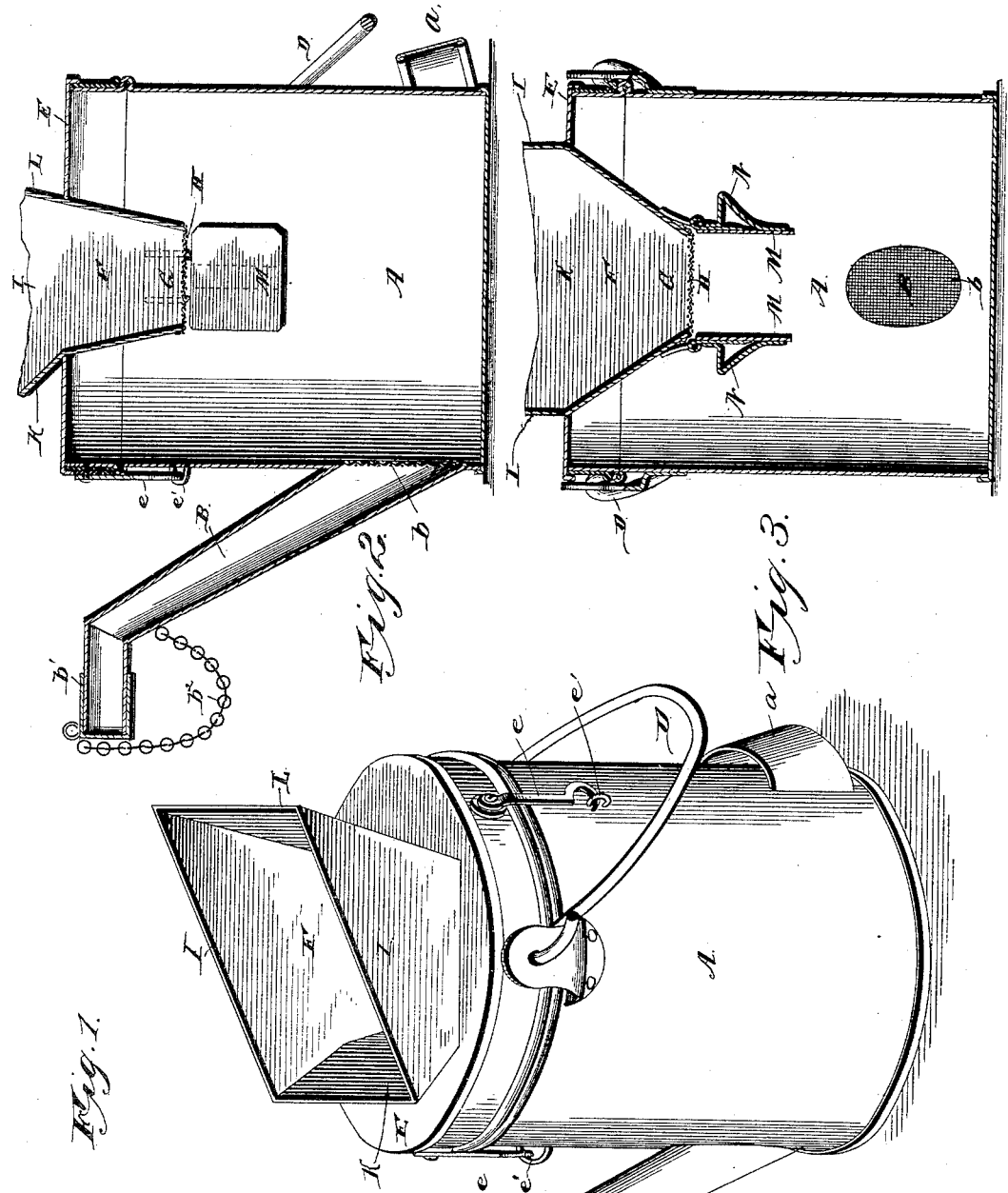

UNITED STATES PATENT OFFICE.

MATTIE A. VAN ALSTINE, OF MOUNTAIN VALLEY, ARKANSAS.

MILK-PAIL.

SPECIFICATION forming part of Letters Patent No. 394,034, dated December 4, 1888.

Application filed July 31, 1888. Serial No. 281,547. (No model.)

*To all whom it may concern:*

Be it known that I, MATTIE A. VAN ALSTINE, a citizen of the United States, residing at Mountain Valley, in the county of Garland and State of Arkansas, have invented new and useful Improvements in Milk-Pails, of which the following is a specification.

My invention relates to improvements in milk-pails, having for its object to provide a simple, cheap, durable, and convenient pail, which is so constructed that the milk may be readily placed therein, but cannot escape when the pail is accidentally tipped over.

The invention consists in a certain novel construction and arrangement of devices, fully set forth hereinafter, and particularly pointed out in the claims.

In the drawings, Figure 1 is a perspective view of a milk-pail embodying the improvements. Fig. 2 is a vertical longitudinal central sectional view thereof. Fig. 3 is a transverse central sectional view of the cover and the attached strainer.

Referring to the drawings, A designates the body of the pail, which is provided on one side with the spout B, having a strainer, $b$, near its lower end and a cap or stopper, $b'$, on its upper end, and is provided on either side with a handle, $a$, which is arranged close to the bottom of the body, whereby the latter is prevented from tipping backward. The body is also provided with a bail, D, whereby the pail may be carried.

E represents the cover, which is fitted on the upper end of the body, and is provided with the depending hooks $e$ to engage keepers $e'$ on the sides of the body, and in this cover is arranged the strainer F, having inclined sides, which pass through the cover and converge toward their lower ends to form a small opening, G, which is fitted with the screen H.

The sides of the strainer are extended above the cover to form the vertical side guards, I I, the forwardly-inclined lip K on the front side, and the rearwardly-inclined shield L on the rear side. In milking, the milk is directed into the strainer, and it will be seen that the shield will protect the operator from being splashed, while the side guards will prevent the milk from splashing laterally.

M M represent flaps, which are hinged to the lower end of the strainer on opposite sides of the opening G, whereby when the pail is tipped toward either side one of the flaps will close over the lower end of the strainer. The flaps are provided with the braces or stops N N, which are adapted to strike against the sides of the strainer when they are swung back, to prevent them from swinging outward farther than a horizontal position.

It will be seen that as the milk is received in the pail it is strained, and if perchance the pail should be turned over on either side (it cannot tip backward or forward, owing to the handle $a$ and the spout B) the lower end of the strainer is simultaneously closed to prevent the escape of the contents. The milk cannot escape through the spout, as its outer end is closed by the cap or stopper $b'$, which is attached to the spout by means of a short chain, $b^2$.

Having thus described the invention, I claim—

1. In a milk-pail, the combination, with the body, of the cover fitting over the body and provided with a strainer having its lower end in the body, and the flaps hinged to the lower end of the strainer on opposite sides thereof, whereby when the pail is tipped over, one of the flaps closes the lower end of the strainer and prevents the escape of the contents of the pail, substantially as specified.

2. In a milk-pail, the combination, with the body, of the cover fitting thereon, the strainer F, arranged therein and provided with inclined sides, which are extended above the cover to form the side guards, I I, the rear shield, L, and the lip K, and the flaps M M, hinged to the lower end of the strainer and adapted to close over the same, the said flaps being provided with braces or stops N N on their outer sides, substantially as and for the purpose specified.

3. In a milk-pail, the body provided with a handle, $a$, arranged close to its bottom to prevent the body from tipping backward, and provided with a spout, B, having a cap or stopper, $b'$, fitting on its outer end and connected thereto by a chain, $b^2$, in combination with the cover fitting on the upper end of the body and provided with a strainer, F, having the opening G at its lower end covered with the screen H, and the hinged flaps arranged, respectively, at the sides of the opening G and adapted to close over the same when the pail tips to one side, substantially as specified.

In testimony that I claim the foregoing as my own I have hereto affixed my signature in presence of two witnesses.

MATTIE A. VAN ALSTINE.

Witnesses:
 F. G. McLEOD,
 C. W. FRY.